(12) United States Patent
Umeda

(10) Patent No.: US 11,493,935 B2
(45) Date of Patent: Nov. 8, 2022

(54) OPERATION CONTROL DEVICE AND VEHICLE

(71) Applicant: TOYOTA JIDOSHA KABUSHIKI KAISHA, Toyota (JP)

(72) Inventor: Kazuhiro Umeda, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 16/778,615

(22) Filed: Jan. 31, 2020

(65) Prior Publication Data

US 2020/0278694 A1  Sep. 3, 2020

(30) Foreign Application Priority Data

Mar. 1, 2019  (JP) .............................. JP2019-037425

(51) Int. Cl.
*G05D 1/02* (2020.01)
*G05D 1/00* (2006.01)

(52) U.S. Cl.
CPC ......... *G05D 1/0291* (2013.01); *G05D 1/0088* (2013.01); *G05D 2201/0213* (2013.01)

(58) Field of Classification Search
CPC ..... G05D 1/0291–0297; G05D 1/0088; G05D 2201/0212–0213; G08G 1/0968; G08G 1/123
See application file for complete search history.

(56) References Cited

U.S. PATENT DOCUMENTS

| | | | |
|---|---|---|---|
| 9,659,492 B2 | 5/2017 | Modica et al. | |
| 10,948,927 B1* | 3/2021 | Harris | ...................... G08G 1/22 |
| 2011/0184605 A1 | 7/2011 | Neff | |
| 2014/0197967 A1* | 7/2014 | Modica | ............ G08G 1/096775 340/932 |
| 2014/0316671 A1 | 10/2014 | Okamoto | |
| 2018/0274935 A1 | 9/2018 | Sugiyama | |

FOREIGN PATENT DOCUMENTS

| | | |
|---|---|---|
| JP | 2000-264210 A | 9/2000 |
| JP | 2005-222144 A | 8/2005 |
| JP | 2018-163471 A | 10/2018 |

\* cited by examiner

*Primary Examiner* — Aaron L Troost
(74) *Attorney, Agent, or Firm* — Oblon, McClelland, Maier & Neustadt, L.L.P.

(57) ABSTRACT

Aspects of the disclosure provide an operation control device for controlling vehicle-to-vehicle distances between a plurality of vehicles autonomously traveling on a circuit route. The operation control device can include a transmission device that is configured to, at a time of removal, remove at least one of the vehicles from the circuit route and transmit future time information and positional information indicative of a target position to each of the at least three vehicles except for a removal target vehicle as a vehicle targeted for the removal. Further, the future time information and positional information being transmitted such that a first vehicle-to-vehicle distance between a first vehicle and a second vehicle and a second vehicle-to-vehicle distance between the second vehicle and a third vehicle becomes equal.

13 Claims, 6 Drawing Sheets

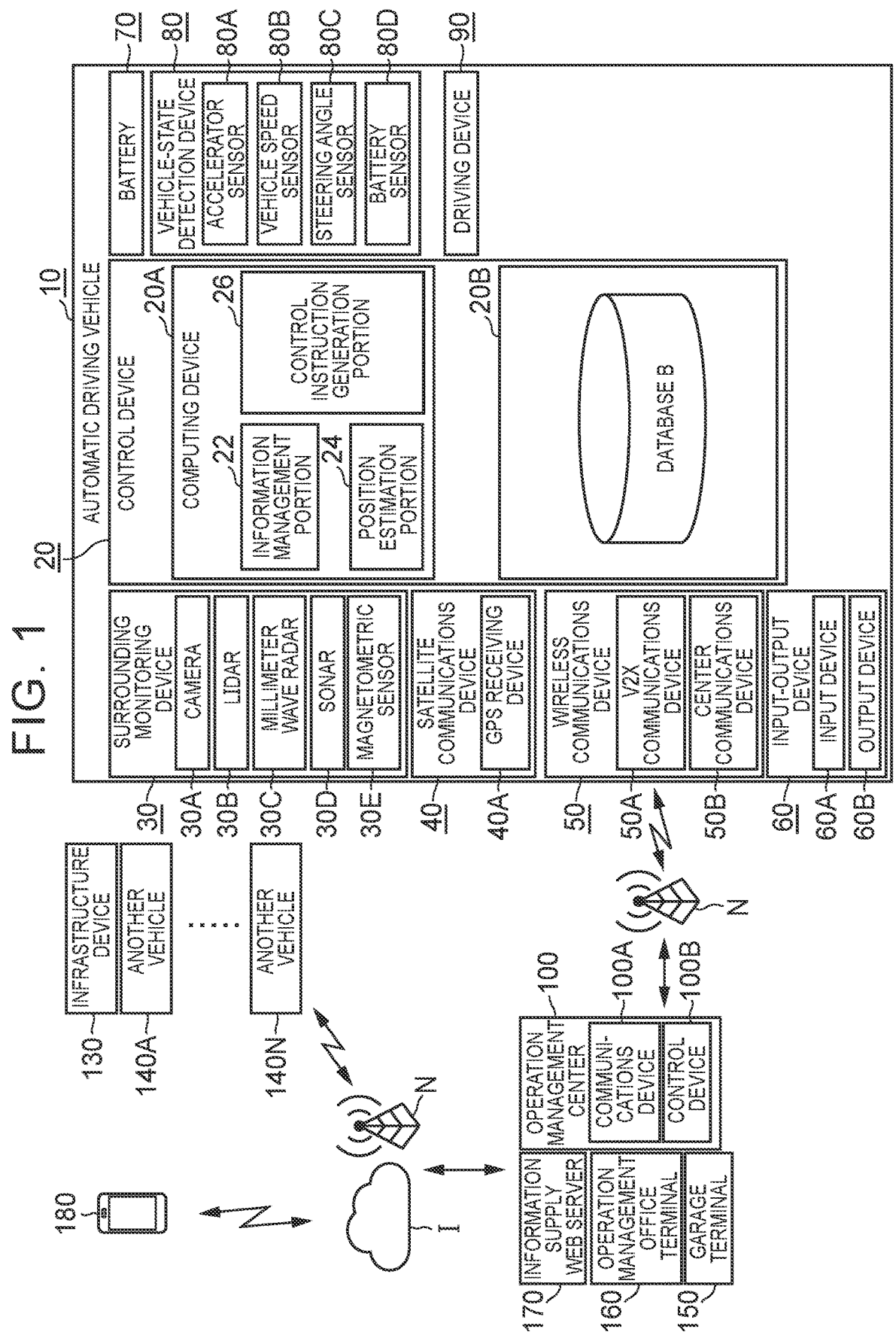

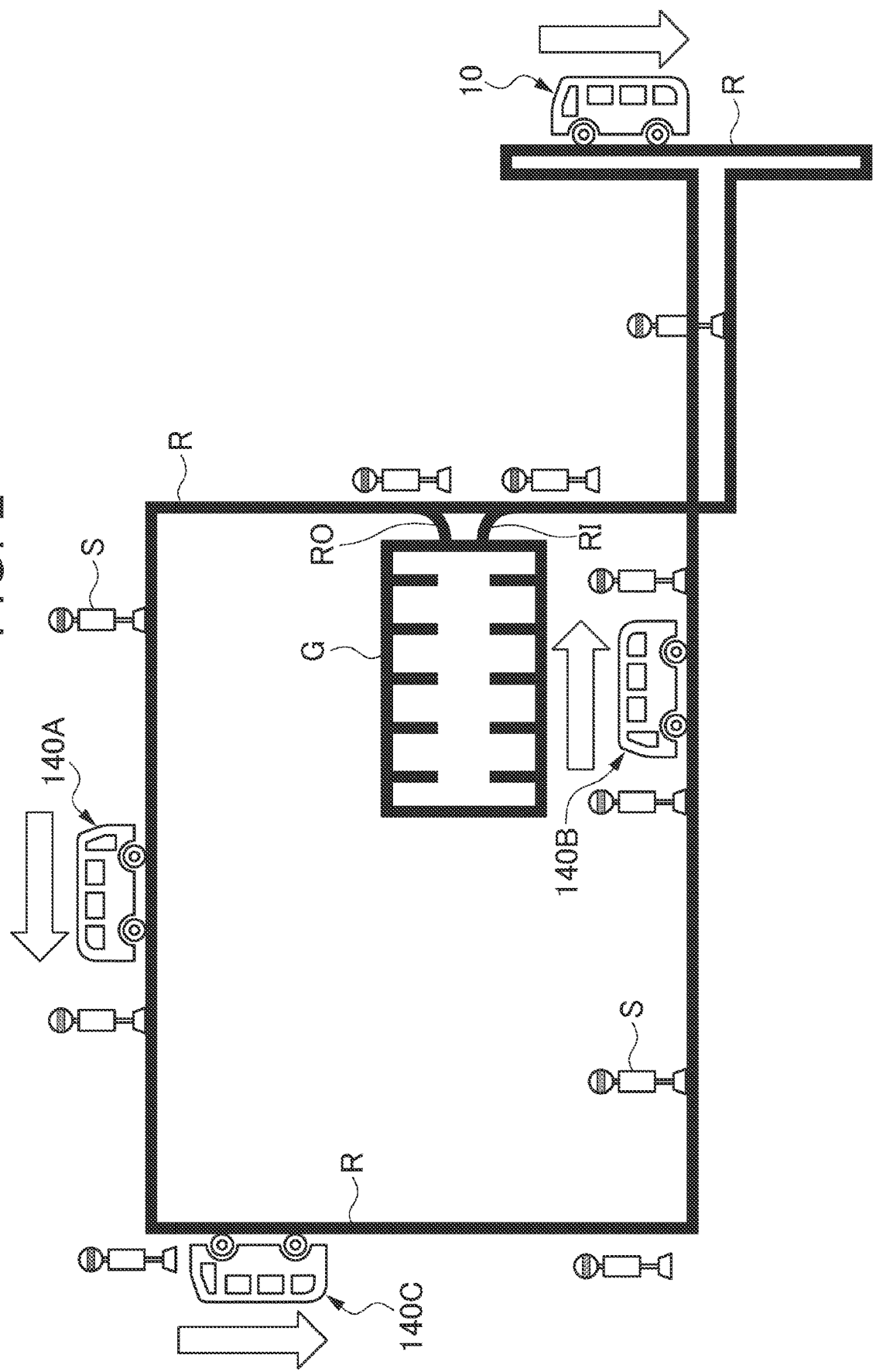

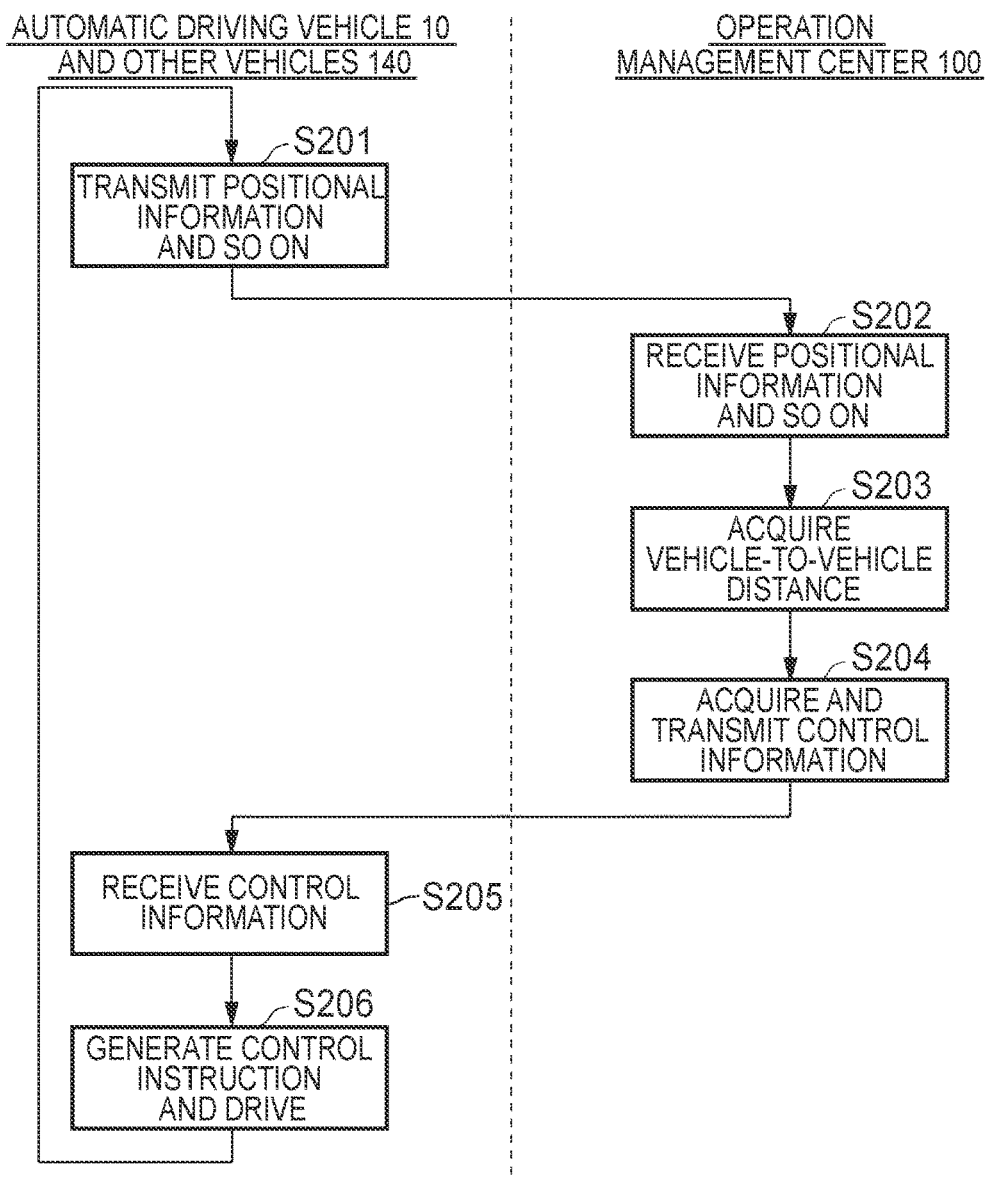

FIG. 5

| TIME SLOT | 5:00 | 6:00 | 7:00 | 8:00 | 9:00 | 10:00 | ... |
|---|---|---|---|---|---|---|---|
| NUMBER OF VEHICLES | 4 | 6 | 8 | 12 | 10 | 8 | ... |
| ANOTHER VEHICLE 140A | OPERATION | OPERATION | OPERATION | OPERATION | REMOVAL | CHARGING | ... |
| ANOTHER VEHICLE 140B | CHARGING | INTRODUCTION | OPERATION | OPERATION | OPERATION | OPERATION | ... |
| ... | ... | ... | ... | ... | ... | ... | ... |

OPERATION CONTROL DEVICE AND VEHICLE

INCORPORATION BY REFERENCE

The disclosure of Japanese Patent Application No. 2019-037425 filed on Mar. 1, 2019 including the specification, drawings and abstract is incorporated herein by reference in its entirety.

BACKGROUND

1. Technical Field

The present disclosure relates to an operation control device and a vehicle.

2. Description of Related Art

In recent years, there has been known an operation control device configured to control a plurality of vehicles traveling on a circuit route.

Japanese Unexamined Patent Application Publication No. 2005-222144 (JP 2005-222144 A) describes an operation support system configured such that, in a shuttle bus system, pieces of positional information and congestion states are collected from a plurality of buses, and some of the buses are instructed to change their operating speeds or skip a bus stop at which they are scheduled to stop so that congestion levels are equalized.

SUMMARY

However, in a case where a vehicle such as an electric vehicle that travels by use of an electric motor as a power source travels on a circuit route, removal to remove the vehicle from the circuit route for battery charging or the like and introduction to introduce the vehicle into the circuit route should be performed frequently. On this account, an operation control device that can operate a plurality of vehicles in a balanced manner even at the time of such removal or introduction is required. Further, when the operating speeds of some of the buses are changed as described in JP 2005-222144 A, this change might newly cause imbalance.

In view of this, an object of the present disclosure is to provide an operation control device that can operate a plurality of vehicles in a balanced manner even at the time of removal or introduction, and a vehicle.

This disclosure relates to an operation control device for controlling vehicle-to-vehicle distances between a plurality of vehicles autonomously traveling on a circuit route. The operation control device includes a transmission unit configured such that, at the time of removal to remove at least one of the vehicles from the circuit route, the transmission unit transmits, to each of at least three vehicles except for a removal target vehicle as a vehicle targeted for the removal, future time information and positional information indicative of a target position for the each of the at least three vehicles except for the removal target vehicle at a time indicated by the time information.

Further, the operation control device may further include a vehicle-to-vehicle distance acquisition unit configured to acquire vehicle-to-vehicle distance information indicative of a vehicle-to-vehicle distance between the vehicles, and the transmission unit may be configured to transmit the time information and the positional information that are acquired based on at least three pieces of vehicle-to-vehicle distance information.

Further, the vehicle-to-vehicle distance acquisition unit may be configured to further acquire second vehicle-to-vehicle distance information indicative of a distance between a vehicle preceding the removal target vehicle and a vehicle following the removal target vehicle while the removal target vehicle is traveling on the circuit route, and the transmission unit may be configured to transmit the time information and the positional information further based on the second vehicle-to-vehicle distance information.

Further, the transmission unit may be configured to transmit, to the vehicle preceding the removal target vehicle, the time information and the positional information based on the vehicle-to-vehicle distance information and the second vehicle-to-vehicle distance information so that a vehicle-to-vehicle distance between the vehicle and a vehicle preceding the vehicle is equal to a distance between the vehicle and the vehicle following the removal target vehicle.

Further, this disclosure relates to an operation control device for controlling vehicle-to-vehicle distances between a plurality of vehicles autonomously traveling on a circuit route. The operation control device includes a transmission unit configured such that, at the time of introduction to introduce at least one vehicle into the circuit route, the transmission unit transmits, to each of at least three vehicles including an introduction target vehicle as a vehicle targeted for the introduction, future time information and positional information indicative of a target position for the each of the at least three vehicles including the introduction target vehicle at a time indicated by the time information.

Here, the operation control device may further include a vehicle-to-vehicle distance acquisition unit configured to acquire vehicle-to-vehicle distance information indicative of a vehicle-to-vehicle distance between the vehicles, and the transmission unit may be configured to transmit the time information and the positional information that are acquired based on at least three pieces of vehicle-to-vehicle distance information.

Further, this disclosure relates to an operation control device for controlling vehicle-to-vehicle distances between a plurality of vehicles autonomously traveling on a circuit route. The operation control device includes a vehicle-to-vehicle distance acquisition unit and a transmission unit. The vehicle-to-vehicle distance acquisition unit is configured such that, when the vehicles including a removal target vehicle as a vehicle targeted for removal at a time when the vehicle is removed from the circuit route and an introduction target vehicle as a vehicle targeted for introduction at a time when the vehicle is introduced into the circuit route so as to follow the removal target vehicle travel on the circuit route, the vehicle-to-vehicle distance acquisition unit acquires vehicle-to-vehicle distance information indicative of a vehicle-to-vehicle distance between the vehicles and second vehicle-to-vehicle distance information indicative of a distance between a vehicle preceding the removal target vehicle and a vehicle following the removal target vehicle. The transmission unit is configured to transmit, to the introduction target vehicle following the removal target vehicle, future time information and positional information acquired based on a plurality of pieces of vehicle-to-vehicle distance information and the second vehicle-to-vehicle distance information, the positional information being indicative of a target position for the introduction target vehicle at a time indicated by the time information, the time information and the positional information being transmitted so that a distance between the introduction target vehicle and the vehicle preceding the removal target vehicle becomes equal to a vehicle-to-vehicle distance between the introduction target vehicle and a vehicle following the introduction target vehicle. Further, the transmission unit is configured to transmit, to the removal target vehicle, the time information and the positional information based on the pieces of vehicle-to-vehicle distance information so that a vehicle-to-vehicle distance between the removal target vehicle and the introduction target vehicle is smaller than a vehicle-to-vehicle distance between the removal target vehicle and the vehicle preceding the removal target vehicle.

Further, this disclosure relates to a vehicle autonomously traveling on a circuit route. The vehicle includes: a unit configured to transmit positional information of the vehicle to an operation control device configured to control vehicle-to-vehicle distances between a plurality of vehicles including the vehicle autonomously traveling on the circuit route and other vehicles; a unit configured to receive, from the operation control device, future time information and positional information indicative of a target position for the vehicle at a time indicated by the time information, when at least one of the other vehicles is removed from the circuit route or at least one vehicle is introduced into the circuit route; and a control unit configured to generate a control instruction to control the vehicle so that the vehicle reaches the target position at the time indicated by the time information.

Further, this disclosure relates to an information supply device for supplying, to a user of a vehicle, information related to a plurality of vehicles autonomously traveling on a circuit route. The information supply device can supply pieces of positional information of the vehicles including a removal target vehicle as a vehicle targeted for removal at the time of the removal to remove at least one vehicle from the circuit route. Here, at least the vehicles except for the removal target vehicle are controlled so that vehicle-to-vehicle distances between the vehicles except for the removal target vehicle are equal to each other. When the removal target vehicle is removed from the circuit route, the positional information of the removal target vehicle is controlled such that it is not supplied to the user. Further, the information supply device can supply pieces of positional information of the vehicles including an introduction target vehicle as a vehicle targeted for introduction at the time when at least one vehicle is introduced into the circuit route. Here, the introduction target vehicle is controlled such that vehicle-to-vehicle distances between the vehicles except for the removal target vehicle are equal to each other. In a case where the removal target vehicle is traveling on the circuit route, it is preferable to control the introduction target vehicle such that the introduction target vehicle travels following the removal target vehicle. At this time, it is preferable to control the removal target vehicle and the introduction target vehicle such that the vehicle-to-vehicle distance between the removal target vehicle and a vehicle preceding the removal target vehicle is larger than a vehicle-to-vehicle distance between the removal target vehicle and the introduction target vehicle.

Note that it is preferable to transmit the time information and the positional information to each of at least three vehicles such that, in terms of at least either one of a vehicle-to-vehicle distance from a preceding vehicle and a vehicle-to-vehicle distance from a following vehicle, those three vehicles have the same distance or have respective distances with a small difference.

Such an operation control device includes the transmission unit configured to transmit, to not only the vehicles in front of and behind the removal target vehicle but also the other vehicles, future time information and positional information indicative of the target positions for the vehicles at the time indicated by the time information, thereby making it possible to operate the vehicles in a more balanced manner.

At least three pieces of vehicle-to-vehicle distance information may be acquired from four vehicles traveling consecutively, or vehicle-to-vehicle distance information that can be acquired from a pair of two vehicles traveling consecutively may be acquired from each of three pairs traveling at positions separated from each other. The vehicle-to-vehicle distance information may be acquired based on distance information from a following vehicle to a preceding vehicle.

With such an operation control device, at the time point when the removal target vehicle is removed from the circuit route, other vehicles traveling on the circuit route can be caused to travel such that their vehicle-to-vehicle distances are generally equal to each other. Further, in terms of the introduction target vehicle, at the time point of the introduction or after the introduction, the vehicles can be caused to travel such that the distances between the vehicles including the introduction target vehicle immediately become equal to each other. Note that there may be a vehicle such as a damaged vehicle that is present on the circuit route but is not targeted for the adjustment of the vehicle-to-vehicle distance. For example, in a case where 16 vehicles are traveling on the circuit route, vehicle-to-vehicle distances between 14 vehicles except for one removal target vehicle and one damaged vehicle may be acquired, and time information and positional information may be transmitted to those 14 vehicles such that the vehicle-to-vehicle distances are equal to each other.

Note that the operation control device may perform the removal and the introduction at the same time. Such an operation control device can include the transmission unit configured to transmit, to each of at least four vehicles including the introduction target vehicle except for the removal target vehicle, future time information and positional information indicative of a target position for a corresponding vehicle at the time indicated by the time information. Further, the transmission unit may be configured to acquire vehicle-to-vehicle distance information between a preceding vehicle and a following vehicle of each of the four vehicles and transmit the time information and the positional information such that pieces of vehicle-to-vehicle distance information on the four vehicles are equal to each other.

Further, this disclosure relates to an operation control method for controlling vehicle-to-vehicle distances between a plurality of vehicles autonomously traveling on a circuit route. Such an operation control method includes a step of, at the time of removal to remove at least one of the vehicles from the circuit route, transmitting, to each of at least three vehicles except for a removal target vehicle as a vehicle targeted for the removal, future time information and positional information indicative of a target position for the each of the at least three vehicles except for the removal target vehicle at a time indicated by the time information.

Further, this disclosure relates to an operation control method for controlling vehicle-to-vehicle distances between a plurality of vehicles autonomously traveling on a circuit route. Such an operation control method includes a step of, at the time of introduction to introduce at least one vehicle into the circuit route, transmitting, to each of at least three vehicles including an introduction target vehicle as a vehicle targeted for the introduction, future time information and positional information indicative of a target position for the each of the at least three vehicles including the introduction target vehicle at a time indicated by the time information.

Further, this disclosure relates to a vehicle autonomously traveling on a circuit route. The vehicle includes: a unit configured to transmit positional information of the vehicle to an operation control device configured to control vehicle-to-vehicle distances between a plurality of vehicles including the vehicle autonomously traveling on the circuit route and other vehicles; a unit configured to receive, from the operation control device, future time information and positional information indicative of a target position for the vehicle at a time indicated by the time information, when at least one of the other vehicles is removed from the circuit route or at least one vehicle is introduced into the circuit route; and a control unit configured to control the vehicle so that the vehicle reaches the target position at the time indicated by the time information.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a functional block diagram of an automatic driving vehicle 10 and a schematic view of an operation system including the automatic driving vehicle 10 and others;

FIG. 2 is a schematic view illustrating a state where the automatic driving vehicle 10 and other vehicles 140 controlled by an operation management center 100 travel on a circuit route R;

FIG. 3 is a flowchart illustrating an operation method for the automatic driving vehicle 10 and the other vehicles 140 by the operation management center 100;

FIG. 4 illustrates an example of control information of the automatic driving vehicle 10 and others that a control device 100B acquires;

FIG. 5 illustrates an example of a table illustrating the number of the automatic driving vehicle 10 and others traveling on the circuit route R per time slot;

DETAILED DESCRIPTION OF EMBODIMENTS

Figure 6A:
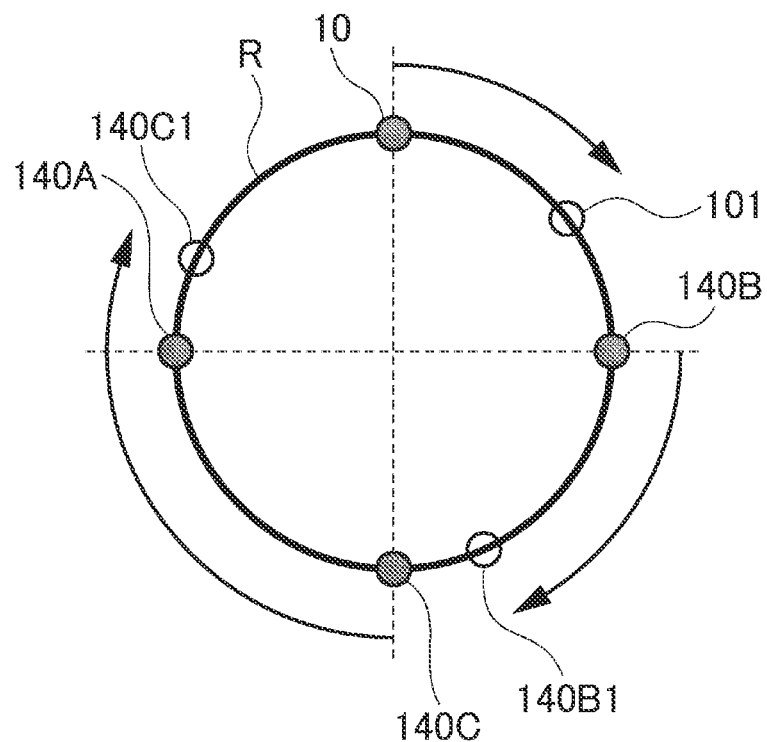
FIG. 6A is a schematic view illustrating an operation control method in a preparation stage of removal.

The following describes embodiments of the present disclosure with reference to the drawings. The following embodiments are examples to describe the present disclosure and are not intended to limit the present disclosure to the embodiments.

FIG. 1 illustrates a functional block diagram of an automatic driving vehicle 10. The automatic driving vehicle 10 described in the present embodiment is a large-size vehicle that can carry up to 30 passengers. The automatic driving vehicle 10 is an automatic driving vehicle configured to autonomously travel based on control information and so on received from an operation management center 100. However, an occupant who can handle an emergency or a passenger may also board the automatic driving vehicle 10.

The automatic driving vehicle 10 includes a control device 20 configured to perform automatic driving, a surrounding monitoring device 30, a satellite communications device 40, a wireless communications device 50, an input-output device 60, a battery 70, a vehicle-state detection device 80, and a driving device 90.

The control device 20 is connected to respective devices of the automatic driving vehicle 10, including devices from the surrounding monitoring device 30 to the driving device 90, via an internal bus or the like (not shown) so as to control these devices. Further, the control device 20 receives a predetermined signal from each device via the internal bus and generates and outputs a control instruction to drive each device based on the received signal. The control device 20 includes a computing device 20A and a storage device 20B. When the computing device 20A executes computer programs stored in the storage device 20B, various computing processes executed by the automatic driving vehicle 10 in this disclosure are executed.

The computing device 20A executes a predetermined computing process in accordance with a computer program such as firmware stored in the storage device 20B. The computing device 20A can be constituted by one or more central processing units (CPU), a micro processing unit (MPU), a GPU, a microprocessor, a processor core, a multiprocessor, an application-specific integrated circuit (ASIC), a field programmable gate array (FPGA), and so on.

The storage device 20B includes a nonvolatile memory such as an MRAM, a NAND flash memory, an NOR flash memory, an SSD, or a hard disk drive, and a volatile memory such as an SRAM or a DRAM. The nonvolatile memory includes a database D in which computer programs to execute various computing processes illustrated in the flowchart or the like in this disclosure, map information including a dynamic map (highly precise map information generated dynamically as digital map information that integrates static base map information showing road shapes and the like with dynamic environmental information about a real-time dynamic road-surface condition of a road, an accident occurrence point, a vehicle position, a pedestrian position, and so on), and various other pieces of data necessary in this disclosure are stored. The nonvolatile memory corresponds to a non-transitory tangible medium. The volatile memory provides a working area in which a computer program loaded from the nonvolatile memory and various pieces of data generated while the computing device 20A executes a computer program are temporarily stored. Note that a computer program or data received by the wireless communications device 50 from outside may be stored in the nonvolatile memory.

The control device 20 functionally includes an information management portion 22, a position estimation portion 24, and a control instruction generation portion 26. The information management portion 22 collects information necessary for automatic driving from the surrounding monitoring device 30, the satellite communications device 40, the wireless communications device 50, the vehicle-state detection device 80, and so on and supplies it to the position estimation portion 24 and the control instruction generation portion 26.

The position estimation portion 24 regularly acquires an absolute position of the automatic driving vehicle 10 as absolute coordinates of latitude and longitude based on the dynamic map stored in the storage device 20B and position estimation information collected by the information management portion 22 and acquires relative coordinates of the automatic driving vehicle 10 relative to an object around the automatic driving vehicle 10. The control device 20 transmits absolute position information and relative position information acquired by the position estimation portion 24 to the operation management center 100 by use of the wireless communications device 50.

The control instruction generation portion 26 generates a control instruction to drive the automatic driving vehicle 10 in accordance with the dynamic map stored in the storage device 20B, positional information of the automatic driving vehicle 10 that is acquired from the position estimation portion 24, traveling state information of the automatic driving vehicle 10 that is collected by the information management portion 22, and control information received from the operation management center 100, and the control instruction generation portion 26 outputs it to the driving device 90. The control instruction generation portion 26 regularly acquires a current position of the automatic driving vehicle 10 from the position estimation portion 24, generates the control instruction so that the position of the automatic driving vehicle 10 follows the control information received from the operation management center 100 to the utmost, and outputs it to the driving device 90. However, the control instruction generation portion 26 may recognize an obstacle or the like based on a surrounding state around the automatic driving vehicle 10 that is detected by the surrounding monitoring device 30, generate a control instruction to decelerate, stop, or steer the automatic driving vehicle 10 so as to avoid contact with the obstacle regardless of the control information received from the operation management center 100, and supply it to the driving device 90. The control information supplied from the operation management center 100 will be described later in detail. Note that the automatic driving vehicle 10 is configured to stop an automatic operation mode based on an operation by an occupant on the input-output device 60 and to travel based on operations by the occupant on a steering wheel, an accelerator pedal, a brake pedal, and so on. In this case, the control device 20 generates a control instruction to drive the automatic driving vehicle 10 based on operations by the occupant on the steering wheel and so on and supplies it to the driving device 90.

The surrounding monitoring device 30 includes sensors such as a camera 30A, a laser detection and ranging (LIDAR) 30B, a millimeter wave radar 30C, a sonar 30D, and a magnetometric sensor 30E. The surrounding monitoring device 30 detects surrounding environments, e.g., an object such as a vehicle, people, or an obstacle around the automatic driving vehicle 10, a distance to the object, a direction of the object, a white line on a road or the like on which the automatic driving vehicle 10 travels, a road-surface condition, and so on by use of the sensors, and supplies the surrounding environments to the control device 20.

The satellite communications device 40 includes a GPS receiving device 40A. The GPS receiving device 40A receives a positioning signal from a GPS satellite 110 and supplies it to the control device 20 as positional information of the automatic driving vehicle 10. The position estimation portion 24 of the control device 20 acquires a current position of the automatic driving vehicle 10 based on the received positioning signal. The control device 20 may determine the current position based on the map stored therein in advance and a result from the LIDAR without the use of the GPS.

The wireless communications device 50 includes a vehicle-to-X (V2X) communications device 50A and a center communications device 50B. More specifically, the V2X communications device 50A includes a communications device based on the telecommunications standard such as 802.11ac defined by IEEE for vehicle-to-cellular network (V2N) communication, vehicle-to-vehicle (V2V) communication, vehicle-to-road side infrastructure (V2I) communication, and vehicle-to-pedestrian (V2P) communication. The center communications device 50B includes a communications device configured to communicate with the operation management center 100. Accordingly, the automatic driving vehicle 10 can perform high-speed communication with a plurality of infrastructure devices 130 provided in traffic lights or the like or buried under a road surface, a plurality of other vehicles 140, and the operation management center 100.

The input-output device 60 includes an input device 60A and an output device 60B. The input device 60A is a device into which an occupant or a passenger inputs information. The input device 60A includes a microphone configured to receive voice input by the occupant and the passenger and sound recognition processing software corresponding to a plurality of languages. The occupant can input an order to control the automatic driving vehicle 10 through the microphone. The passenger can input a bus stop where the passenger is to get off the automatic driving vehicle 10 or search for the bus stop through the microphone. Further, the input device 60A includes an IC card unit configured to identify the occupant and the passenger. The occupant or the like holds his or her own IC over the IC card unit so that the automatic driving vehicle 10 can recognize that the occupant or the like boards the automatic driving vehicle 10. Further, the input device 60A includes a touch panel and a mechanical switch, and the occupant and the passenger can input information by use of them. For example, the occupant can operate, by use of the mechanical switch, opening and closing of a door of the automatic driving vehicle 10 stopping at a bus stop.

The output device 60B includes a display device configured to output image information and a speaker configured to output voice information. A circuit route where the automatic driving vehicle 10 is scheduled to travel, the current position of the automatic driving vehicle 10, and the like are shown on the image information.

The battery 70 is a secondary battery such as a lithium-ion battery or a nickel-metal hydride battery and is configured to supply power to various actuators provided in the driving device 90.

The vehicle-state detection device 80 includes an acceleration sensor 80A, a vehicle speed sensor 80B, a steering angle sensor 80C, a battery sensor 80D, and so on. The battery sensor 80D is configured to detect a remaining capacity of the battery 70 and supply it to the control device 20. The control device 20 can transmit battery remaining capacity information to the operation management center 100 by use of the wireless communications device 50. Further, the vehicle-state detection device 80 detects a traveling state of the automatic driving vehicle 10 by use of these sensors and supplies it to the control device 20.

The driving device 90 includes a motor and other actuators for operations of an engine, a brake, and the steering wheel of the automatic driving vehicle 10 and operates based on the control instruction received from the control device 20. As described above, the automatic driving vehicle 10 is configured to stop the automatic driving and to output, to the driving device 90 or the like, the control instruction generated by the control device 20 based on the operations on the accelerator pedal, the brake pedal, the steering wheel, and so on by the occupant or the like.

The operation management center 100 is a supervision device configured to control the automatic driving vehicle 10 and the other vehicles 140 that are other automatic driving vehicles and having the same configuration as the automatic driving vehicle 10. More specifically, the operation management center 100 receives, from each of the automatic driving vehicle 10 and the other vehicles 140, respective pieces of information indicative of a current position, the number of passengers, and a battery remaining capacity, together with information to identify the automatic driving vehicle 10 or the other vehicles 140. Base on this, the operation management center 100 acquires respective pieces of positional information indicative of respective target positions of the automatic driving vehicle 10 and the other vehicles 140 at a predetermined time in the future and transmits them to respective vehicles together with future time information. Further, the operation management center 100 gives a removal instruction to a vehicle or the like with a small remaining capacity of the battery 70 so that the vehicle is removed from the circuit route and heads for a garage, or the operation management center 100 gives an instruction to a vehicle waiting in the garage so that the vehicle is introduced into the circuit route. Note that, when each of the other vehicles is referred to, it is referred to as another vehicle 140A, another vehicle 140N, or the like, and when they are referred to collectively, they are referred to as the other vehicles 140. Further, the automatic driving vehicle 10 and the other vehicles 140 are collectively referred to as the automatic driving vehicle 10 and others. Each constituent in the other vehicles 140 is referred to by use of the same reference sign as a corresponding constituent in the automatic driving vehicle 10 and is not described herein.

The operation management center 100 includes a communications device 100A and a control device 100B. A hardware configuration of the control device 100B is similar to that of the control device 20, and the control device 100B includes a computing device and a storage device. Computer programs, a dynamic map, pieces of positional information of the vehicles, and pieces of identification information of the vehicles are stored in the storage device in association with each other. The computing device executes computing processes described in this disclosure by executing computer programs stored in the storage device.

The operation management center 100 can communicate with the automatic driving vehicle 10, the other vehicles 140, and the infrastructure devices 130 by use of the communications device 100A through a communications carrier base station N. For example, the operation management center 100 is connected to the communications carrier base station N by wired communication, and the communications carrier base station N is connected to the automatic driving vehicle 10 or the other vehicles 140 by radio.

Further, the operation management center 100 is connected to an operation management office terminal 150, a garage terminal 160, and an information supply web server 170 via a wired LAN, for example, by use of the communications device 100A. On this account, the operation management office terminal 150 and the garage terminal 160 can access pieces of information on the current positions and the like of the automatic driving vehicle 10 and the other vehicles 140 that are acquired by the operation management center 100. Accordingly, respective operators of the operation management office terminal 150 and the garage terminal 160 can grasp an operation state at any time and output control instructions to control the vehicles as needed. For example, in emergency, the operator of the operation management office terminal 150 can send a control instruction to urgently stop the vehicles.

Also, the information supply web server 170 can acquire the pieces of information on the current positions and the like of the automatic driving vehicle 10 and the other vehicles 140 that are acquired by the operation management center 100. On this account, a passenger or a boarding scheduled person of the automatic driving vehicle 10 or any of the other vehicles 140 accesses the information supply web server 170 via the Internet I by use of an information processing terminal 180 owned by the passenger or the boarding scheduled person, so that the passenger or the boarding scheduled person can acquire pieces of operation information on the current positions and the like of the automatic driving vehicle 10 and the other vehicles 140. For example, a circuit route R, stop points S, and the current positions of the automatic driving vehicle 10 and others can be displayed on a display device of the information processing terminal 180. When a stop point S displayed on the display device of the information processing terminal 180 is selected, the operation management center 100 may supply pieces of time information on times taken before the automatic driving vehicle 10 and others arrive at the stop point S such that the pieces of time information are displayed on the display device of the information processing terminal 180. Further, when any of the automatic driving vehicle 10 and others displayed on the display device of the information processing terminal 180 is selected, a congestion state of the selected one of the automatic driving vehicle 10 and others and time information on the time required before the selected one of the automatic driving vehicle 10 and others arrives at a predetermined stop point S may be supplied to be displayed on the display device of the information processing terminal 180.

FIG. 2 is a schematic view illustrating a state where the automatic driving vehicle 10 and the other vehicles 140 controlled by the operation management center 100 travel on the circuit route R. As illustrated herein, the circuit route R is a route on which a vehicle returns to an original location when the vehicle travels along the route. The automatic driving vehicle 10 and the other vehicles 140 travel along the circuit route R. For example, the distance around the circuit route R is three kilometers, and up to 15 vehicles among the automatic driving vehicle 10 and others can travel on the circuit route R at the same time. The stop points S where the automatic driving vehicle 10 and the other vehicles 140 stop for a predetermined time so that passengers get on and off the automatic driving vehicle 10 and the other vehicles 140 are provided on the circuit route R. However, the distances between the stop points S are not necessarily the same. Further, stoppage times set for the stop points S are also not necessarily the same. For example, for a stop point S where many occupants are expected to get on and off a vehicle, a stoppage time is set in advance so that the vehicle stops for a longer time than at other stop points S. Further, a garage G is provided at a position out of the circuit route R. A charging station is provided in the garage G, and the automatic driving vehicle 10 and others can charge their batteries 70 while the automatic driving vehicle 10 and others are standing by in the garage G. A route RO connecting the garage G to the circuit route R is a route where the automatic driving vehicle 10 and others standing by in the garage G are to travel when they are introduced into the circuit route R. Further, a route RI connecting the garage G to the circuit route R is a route where the automatic driving vehicle 10 and others traveling on the circuit route R are to travel when they move into the garage G due to removal. Accordingly, in terms of a travel direction of the automatic driving vehicle 10 and others as indicated by arrows in the figure, the route RO where the automatic driving vehicle 10 and others go out from the garage G is connected to the circuit route R at a point ahead of the route RI where the automatic driving vehicle 10 and others enter the garage G in the travel direction. On this account, a passenger who failed to get off a vehicle at a stop point S where the passenger should have got off the vehicle and couldn't but get off the vehicle at a stop point S just before the entry in the garage G can board the automatic driving vehicle 10 and others traveling on the route RO from the garage G and introduced into the circuit route R.

FIG. 3 is a flowchart illustrating an operation method for the automatic driving vehicle 10 and the other vehicles 140 by the operation management center 100 during a normal operation. As illustrated in the figure, each of the automatic driving vehicle 10 and others transmits, to the operation management center 100, current absolute position information and relative position information of the each of the automatic driving vehicle 10 and others that are acquired by the position estimation portion 24 based on positional information or the like received from the GPS receiving device 40A or the like, information indicative of the remaining capacity of the battery 70, and the number of passengers together with identification information of the each of the automatic driving vehicle 10 and others (step S201).

When the control device 100B of the operation management center 100 receives the positional information and so on from the each of the automatic driving vehicle 10 and others (step S202), the control device 100B stores them in the storage device of the control device 100B in association with the each of the automatic driving vehicle 10 and others and acquires pieces of information indicative of vehicle-to-vehicle distances between vehicles among the automatic driving vehicle 10 and others (step S203). The vehicle-to-vehicle distance can be acquired in various methods. For example, a difference between current positional information of the automatic driving vehicle 10 that is received by the control device 100B and current positional information of another vehicle 140B preceding the automatic driving vehicle 10 can be acquired as vehicle-to-vehicle distance information between the automatic driving vehicle 10 and another vehicle 140B preceding the automatic driving vehicle 10. Further, the acquired vehicle-to-vehicle distance information between the automatic driving vehicle 10 and another vehicle 140B preceding the automatic driving vehicle 10 may be divided by the speed of the automatic driving vehicle 10, and a time before the automatic driving vehicle 10 reaches the current position of another vehicle 140B preceding the automatic driving vehicle 10 may be acquired as information corresponding to the vehicle-to-vehicle distance. Here, the speed of the automatic driving vehicle 10 can be acquired by transmitting information from the vehicle speed sensor 80B to the operation management center 100. Further, as another method for acquiring the vehicle-to-vehicle distance information, the control device 100B may acquire, as information corresponding to the vehicle-to-vehicle distance, a difference between a time when positional information is acquired from the automatic driving vehicle 10 and a past time when another vehicle 140B preceding the automatic driving vehicle 10 has passed through the current position of the automatic driving vehicle 10 or its vicinal area. Further, these pieces of information may be corrected appropriately so as to be acquire as the vehicle-to-vehicle distance information. Further, the vehicle-to-vehicle distance information may be acquired based on respective times when the automatic driving vehicle 10 and another vehicle 140B preceding the automatic driving vehicle 10 have passed through one or more fixed points provided on the circuit route R. Thus, the control device 100B acquires the vehicle-to-vehicle distances between all the vehicles traveling on the circuit route R. The vehicle-to-vehicle distance information can be acquired with various accuracy levels depending on a requirement specification.

When the control device 100B acquires the pieces of vehicle-to-vehicle distance information on the automatic driving vehicle 10 and others as described above, the control device 100B acquires future time information and positional information indicative of a target position of each of the automatic driving vehicle 10 and others at a time indicated by the time information and transmits those pieces of information to the each of the automatic driving vehicle 10 and others by use of the communications device 100A (step S204). Control information acquired by the control device 100B is illustrated in FIG. 4.

In FIG. 4, time t0 indicates a current time. Time t1 and its subsequent times indicate future times. For example, time t1 indicates a time one second after time t0 indicative of the current time. Similarly, time t2 indicates a time two seconds after time t0 indicative of the current time. Further, (XA0, YA0) shown in a cell corresponding to the row of another vehicle 140A at time t0 is information indicative of longitude and latitude of the current position of another vehicle 140A at current time t0. Further, (XA1, YA1) shown in a cell corresponding to the row of another vehicle 140A at time t1 is information indicative of longitude and latitude of a target position for another vehicle 140A on the circuit route R at future time t1.

As such, in terms of each of the vehicles traveling on the circuit route R, the control device 100B of the operation management center 100 acquires information indicative of respective target positions for the each of the vehicles on the circuit route R at respective times from future time t1 to future time t10 that is 10 seconds after time t1, for example. Here, the target positions are set so that the vehicle-to-vehicle distances are equal to each other. The control device 100B sets, for example, respective target positions at future time t10 for the vehicles at which the vehicle-to-vehicle distances between the vehicles are equal to each other, and based on future time t10, the control device 100B can set target positions from future time t1 to future time t9. As illustrated in FIG. 2, in a case where a vehicle-to-vehicle distance between another vehicle 140A and the automatic driving vehicle 10 preceding another vehicle 140A is larger than the average value of the vehicle-to-vehicle distances between the vehicles, that is, the average value of a vehicle-to-vehicle distance between the automatic driving vehicle 10 and another vehicle 140B, a vehicle-to-vehicle distance between another vehicle 140B and another vehicle 140C, a vehicle-to-vehicle distance between another vehicle 140C and another vehicle 140A, and the vehicle-to-vehicle distance between another vehicle 140A and the automatic driving vehicle 10, but the vehicle-to-vehicle distance between another vehicle 140A and another vehicle 140C is smaller than the average value of the vehicle-to-vehicle distances between the vehicles, the target position for another vehicle 140A at future time t10 is set to a position relatively far from the current position of another vehicle 140A on the circuit route R, and the target position for another vehicle 140C at future time t10 is set to a position relatively near the current position of another vehicle 140C on the circuit route R. Similarly, the target position for the automatic driving vehicle 10 is set to a position relatively near the current position of the automatic driving vehicle 10. Accordingly, the control device 100B sets a target position for a predetermined vehicle based on positional information or the like of vehicles other than a preceding vehicle or a following vehicle. Note that far and near in this description is based on a distance on a route along the circuit route R.

When each of the automatic driving vehicle 10 and others receives the control information as illustrated in FIG. 4 from the operation management center 100 by use of the center communications device 50B (step S205), the each of the automatic driving vehicle 10 and others supplies it to the control device 20. The control instruction generation portion 26 of the control device 20 generates a control instruction to drive the actuators of the driving device 90 based on the received control information so that the each of the automatic driving vehicle 10 and others can reach its target positions on the circuit route R at respective times indicated by pieces of time information from future time information t1 to future time information t10 (step S206). However, the control instruction is not generated so that the each of the automatic driving vehicle 10 and others reaches its target position by all means at a predetermined future time. For example, in a case where the maximum speed of the automatic driving vehicle 10 and others is limited to 20 kilometers per hour, the control instruction is generated within a range where the limited speed is not exceeded. Further, similarly, the control instruction generation portion 26 of the control device 20 generates the control instruction so that the each of the automatic driving vehicles 10 and others reaches its target position set for a received future time, at the future time as possible as it can under a predetermined restriction condition such as stops at the stop points S and a sudden stop to avoid a collision with an obstacle. Note that, in addition to the above control information, the control device 100B of the operation management center 100 may transmit, to each of the automatic driving vehicle 10 and others, route information including a lane plan to travel along the circuit route R as control information. Further, in a case where a given one of the automatic driving vehicle 10 and others is to be stopped at a given stop point S, control information indicating that its target position at a future time is the same as its current position is transmitted to the given one of the automatic driving vehicle 10 and others during a scheduled stoppage time at the given stop point S.

Steps S201 to S206 are executed regularly, e.g., every one second. Because of this, respective pieces of control information to be received by the automatic driving vehicle 10 and others are updated every one second. For example, a target position (XA2, YA2) received at a predetermined time and indicative of a target position at future time t2 that is two seconds after the predetermined time may be different from a target position (XA1, YA1) received one second after the predetermined time as a target position at future time t1 that is one second after the predetermined time.

In the operation control method, it is possible to transmit control information including respective pieces of positional information indicative of respective target positions at future times to three or more vehicles all at once, thereby making it possible to operate the vehicles in a more balanced manner. Further, since the three or more vehicles are controlled based on at least three or more pieces of vehicle-to-vehicle distance information, it is possible to operate the vehicles in a more balanced manner in comparison with a case where each of the vehicles is operated only based on vehicle-to-vehicle distances from its preceding vehicle and its following vehicle.

For example, in the operation control method according to the present embodiment, even in a case where, among four vehicles traveling consecutively, a vehicle-to-vehicle distance between a first preceding vehicle and a second vehicle in the middle is wide, a vehicle-to-vehicle distance between the second vehicle and a third vehicle is narrow, and a vehicle-to-vehicle distance between the third vehicle and a fourth vehicle is wide, when vehicle-to-vehicle distances between vehicles other than the four vehicles are extremely wide, it is possible to transmit positional information and time information so as to perform acceleration instead of decelerating the first or third vehicle.

Further, in a case where a predetermined vehicle delays because the number of passengers in the predetermined vehicle extremely increases for some reasons, a preceding vehicle preceding the vehicle as a bottleneck is controlled such that the preceding vehicle reaches a stop point at a predetermined time on schedule, in general. Meanwhile, in the operation control method according to the present embodiment, other vehicles distanced from such a preceding vehicle or the vehicle as a bottleneck can be also controlled, thereby making it possible to restrain the imbalance between the vehicle-to-vehicle distances for a shorter time. Note that the vehicle is not limited to an electric vehicle and may be other vehicles including a hydrogen vehicle. Further, the present disclosure can be applied to a control on a train operating along a circuit route.

Removal Control

As described above, the automatic driving vehicle 10 and others are electric vehicles using an electric motor as a drive source, and therefore, removal to remove a vehicle from the circuit route for battery charging of the battery 70 or the like and introduction to introduce a vehicle into the circuit route should be performed frequently.

FIG. 5 is a table illustrating the number of the automatic driving vehicle 10 and others traveling on the circuit route R per time slot. The number of the automatic driving vehicle 10 and others traveling on the circuit route R is counted from the garage G as a starting point. As illustrated in the table of FIG. 5, the number of the automatic driving vehicle 10 and others traveling on the circuit route R changes depending on time, e.g., four vehicles between 5:00 to 6:00 and six vehicles between 6:00 to 7:00, for example. Further, another vehicle 140A travels on the circuit route R from 5:00 to 9:00, and then, another vehicle 140A prepares for removal between 9:00 to 10:00 so as to be removed from the circuit route R. After that, another vehicle 140A stands by in the garage G between 10:00 and 11:00 while another vehicle 140A is charged. Meanwhile, another vehicle 140B performs shifting for introduction between 6:00 to 7:00 so as to be introduced into the circuit route R and travels on the circuit route R from 7:00. As such, each vehicle is controlled by the operation management center 100 such that the each vehicle repeats removal, operation, introduction, and standby. Further, when the remaining capacity of the battery 70 is reduced more than expected, the vehicle may cut the schedule so as to be removed from the circuit route R.

Figure 6B:
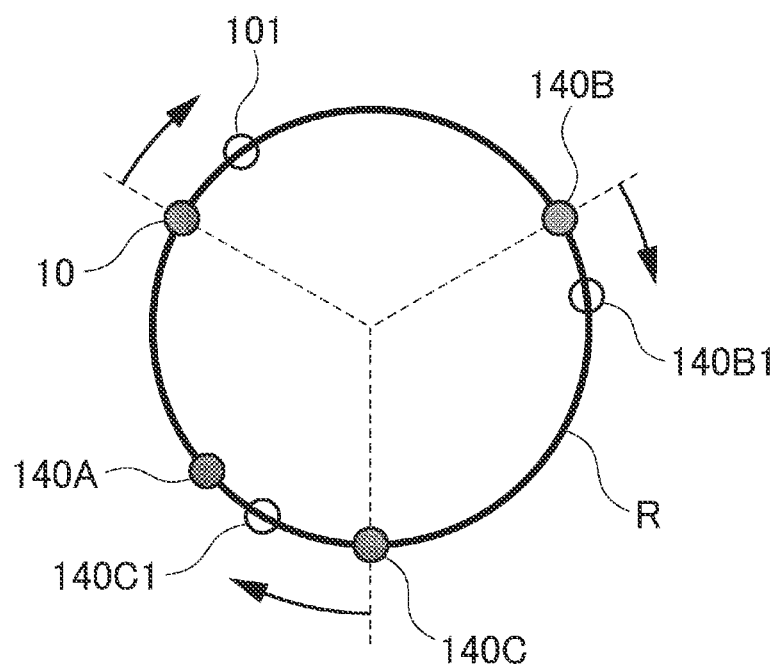
FIG. 6B is a schematic view illustrating an operation state right before the removal.

FIG. 6A is a schematic view illustrating the operation control method in a preparation stage of the removal, and FIG. 6B is a schematic view illustrating an operation state right before the removal.

In FIG. 6A, the automatic driving vehicle 10 and the other vehicles 140A to 140C travel on the circuit route R. The circuit route R is illustrated in a round shape for simplification. Accordingly, a vehicle-to-vehicle distance is expressed by an angle to the center of the circuit route R in a round shape. At the time point illustrated herein, respective vehicle-to-vehicle distances between the automatic driving vehicle 10 and the other vehicles 140A to 140C are generally the same (about 90 degrees). In this state, in a case where another vehicle 140A is to be removed, the control device 100B of the operation management center 100 acquires a distance (an example of "second vehicle-to-vehicle distance information") between the automatic driving vehicle 10 as a preceding vehicle for another vehicle 140A as a removal target vehicle and another vehicle 140C as a following vehicle for another vehicle 140A as the removal target vehicle, in addition to vehicle-to-vehicle distances including another vehicle 140A as the removal target vehicle. Then, the control device 100B sets respective target positions at a future time for the automatic driving vehicle 10, another vehicle 140B, and another vehicle 140C so that the distance between the automatic driving vehicle 10 and another vehicle 140C between which the removal target vehicle 140A is sandwiched becomes equal to other vehicle-to-vehicle distances, i.e., a vehicle-to-vehicle distance between the automatic driving vehicle 10 and another vehicle 140B and a vehicle-to-vehicle distance between another vehicle 140B and another vehicle 140C. The control device 100B then transmits the respective target positions to the automatic driving vehicle 10, another vehicle 140B, and another vehicle 140C. Accordingly, the target position at the future time for the automatic driving vehicle 10 is a position 101, the target position at the same future time for another vehicle 140B is a position 140B1, and the target position at the same future time for another vehicle 140C is a position 140C1. As illustrated in the figure, respective target positions are set to respective vehicles traveling at the same vehicle-to-vehicle distance such that the respective vehicles move by different distances on the circuit route R to the respective target positions from their current positions.

After that, among four vehicles traveling on the circuit route R, three vehicles to remain behind on the circuit route R, i.e., the automatic driving vehicle 10, another vehicle 140B, and another vehicle 140C travel while they are controlled such that their vehicle-to-vehicle distances except for the removal target vehicle are equal to each other. In the meantime, another vehicle 140A as the removal target vehicle travels on the circuit route R without being controlled as above. However, another vehicle 140A may be controlled such that a vehicle-to-vehicle distance to the automatic driving vehicle 10 as the preceding vehicle and a vehicle-to-vehicle distance to another vehicle 140C as the following vehicle become equal to each other. With such a configuration, another vehicle 140A to be removed can also travel while another vehicle 140A carries passengers. However, it is not preferable that another vehicle 140A accept a new passenger after another vehicle 140A is determined to be removed. Further, it is preferable that another vehicle 140A as the removal target vehicle be removed after another vehicle 140A goes around the circuit route R at least once. This is because the vehicle-to-vehicle distances of the automatic driving vehicle 10 and others to remain behind on the circuit route R at the time of the removal can be made generally equal to each other while another vehicle 140A goes around the circuit route R at least once.

FIG. 6B illustrates the operation state right before the removal. As illustrated herein, before another vehicle 140A as the removal target vehicle is actually removed from the circuit route R, the vehicle-to-vehicle distances of the automatic driving vehicle 10 and others to remain behind can be controlled while another vehicle 140A travels on the circuit route R. This allows another vehicle 140A to carry the passengers. Then, in a state where the vehicle-to-vehicle distances between the automatic driving vehicle 10, another vehicle 140B, and another vehicle 140C to remain behind are generally equal to each other, another vehicle 140A can be removed.

Note that the number of the automatic driving vehicle 10 and others to remain behind may be four or more. Further, a special vehicle excluded from the target to be controlled such that the vehicle-to-vehicle distances become equal to each other may be included in the automatic driving vehicle 10 and others to remain behind. For example, in a case where the automatic driving vehicle 10 and others of several types with different full numbers travel on the circuit route R, only the automatic driving vehicle 10 and others of the same type may be targeted for the control. Further, the vehicle-to-vehicle distances may be controlled for the automatic driving vehicle 10 and others of the same type.

Introduction Control

Figure 7A:
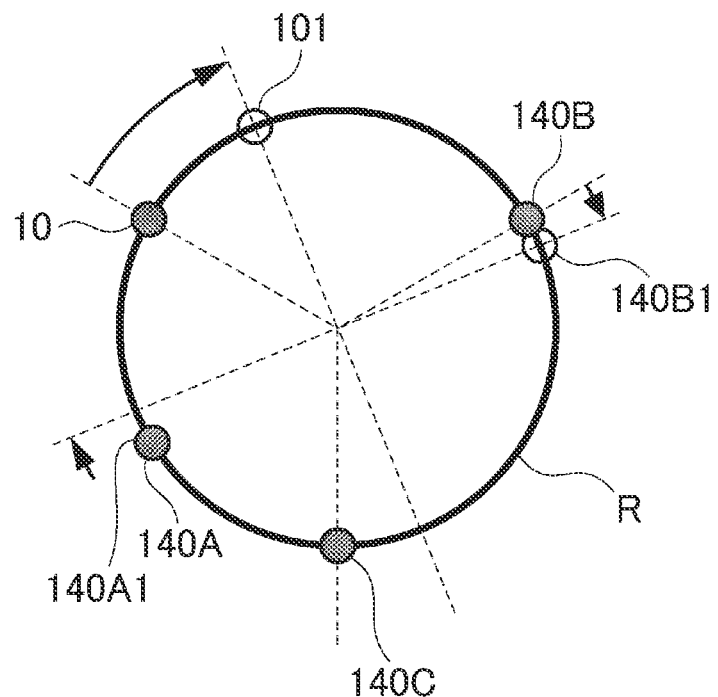
FIG. 7A is a schematic view illustrating an operation state at the time of introduction.
Figure 7B:
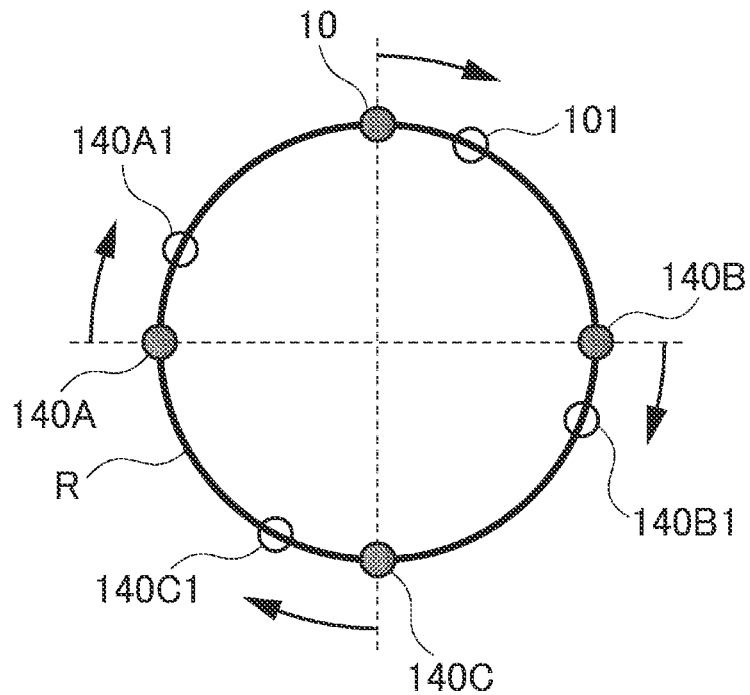
FIG. 7B is a schematic view illustrating an operation state after the introduction.

FIGS. 7A and 7B are schematic views illustrating the operation control method at the time of introduction.

As illustrated in FIG. 7A, in a case where another vehicle 140A is newly introduced into the circuit route R in a state where the automatic driving vehicle 10, another vehicle 140B, and another vehicle 140C travel on the circuit route R at regular intervals, it is preferable to control the vehicle-to-vehicle distances of all the automatic driving vehicle 10 and others traveling on the circuit route R including another vehicle 140A after another vehicle 140A is introduced into the circuit route R. That is, at the time of the removal, the vehicle-to-vehicle distances of the vehicles to remain behind are controlled while the removal target vehicle travels on the circuit route R, thereby making it possible to avoid occurrence of a very large vehicle-to-vehicle distance to be formed between vehicles ahead of and behind the removal target vehicle when the removal target vehicle is removed suddenly. Meanwhile, at the time of the introduction, the vehicle-to-vehicle distances of the vehicles including an introduction target vehicle are controlled after the introduction target vehicle is introduced into the circuit route R, thereby making it possible to avoid occurrence of a very large vehicle-to-vehicle distance between a preceding vehicle and a following vehicle for the introduction target vehicle.

As illustrated in FIG. 7A, it is ideally preferable that another vehicle 140A as the introduction target vehicle be introduced into the circuit route R around an intermediate point between two remaining vehicles, i.e., another vehicle 140C and the automatic driving vehicle 10. That is, it is preferable that another vehicle 140A be introduced into the circuit route R via the route RI within a time that is about half of the time required before another vehicle 140C as a following vehicle passes through a connecting point with the route RI after the automatic driving vehicle 10 as a preceding vehicle has passed through the connecting point with the route RI.

As illustrated in FIG. 7A, after that, the operation management center 100 transmits control information to each of the vehicles so as to control the vehicle-to-vehicle distances of all the automatic driving vehicle 10 and others traveling on the circuit route R, including another vehicle 140A thus introduced. Positional information and time information are transmitted such that the automatic driving vehicle 10 requires relatively large acceleration, the other vehicles 140A and 140B require relatively small acceleration, and another vehicle 140C requires deceleration. Then, after a while, the vehicle-to-vehicle distances of the vehicles are generally equal to each other as illustrated in FIG. 7B.

As described above, in the operation control method according to the present embodiment, at the time of the removal to remove at least one vehicle from the circuit route, future time information and positional information are transmitted to each of at least three vehicles except for the removal target vehicle, the positional information being indicative of a target position for the each of the at least three vehicles except for the removal target vehicle at a time indicated by the time information. Further, at the time when at least one vehicle is introduced into the circuit route, future time information and positional information are transmitted to each of at least three vehicles including the introduction target vehicle, the positional information being indicative of a target position for the each of the at least three vehicles including the introduction target vehicle at a time indicated by the time information. Accordingly, it is possible to provide an operation control device, an operation control method, and a vehicle by which a plurality of vehicles can be operated in a balanced manner even at the time of removal or introduction. Note that the information indicative of the target position to be transmitted by the operation management center 100 to the automatic driving vehicle 10 and others by a predetermined format and protocol may be determined to be information indicative of a target position at a predetermined future time, e.g., a target position after one second. Even in such a case, positional information in which a predetermined position is stored in the predetermined format can be recognized by the automatic driving vehicle 10 and others as positional information indicative of a target position at the predetermined future time.

Note that two or more removal target vehicles may be removed. Even in such a case, the vehicle-to-vehicle distances of the vehicles to remain behind can be controlled while the removal target vehicles are travelling. Further, two or more introduction target vehicles may be introduced into the circuit route R. Even in such a case, the vehicle-to-vehicle distances of the vehicles including two or more introduction target vehicles can be controlled. Further, it is not necessary to control the vehicle-to-vehicle distances between all the vehicles traveling on the circuit route, and a plurality of selected vehicle-to-vehicle distances may be controlled.

Further, the present disclosure can be modified variously without deviating from the gist of the present disclosure. For example, within a range of normal creativity of a person skilled in the art, some constituents in a given embodiment can be added to other embodiments. For example, another vehicle may be introduced into the circuit route while a vehicle with a small battery remaining capacity is removed from the circuit route. In that case, it is preferable to cause the introduction target vehicle to travel following the removal target vehicle. With such a control, it is possible to restrain such a situation that a passenger to board a vehicle fails to board the vehicle and to restrain imbalance between the vehicle-to-vehicle distances. Particularly, it is preferable that time information and positional information be transmitted to the introduction target vehicle following the removal target vehicle based on a plurality of pieces of vehicle-to-vehicle distance information and the second vehicle-to-vehicle distance information so that a distance between the introduction target vehicle and a vehicle preceding the removal target vehicle becomes equal to a vehicle-to-vehicle distance between the introduction target vehicle and a vehicle following the introduction target vehicle, and it is preferable that time information and positional information be transmitted to the removal target vehicle based on the pieces of vehicle-to-vehicle distance information so that a vehicle-to-vehicle distance between the removal target vehicle and the introduction target vehicle is smaller than a vehicle-to-vehicle distance between the removal target vehicle and the vehicle preceding the removal target vehicle. With such a control, it is possible to quickly provide the introduction target vehicle to a passenger who could not board the removal target vehicle. Further, some constituents in a given embodiment may be substituted with a corresponding constituent in other embodiments.

What is claimed is:

1. An operation control device for controlling vehicle-to-vehicle distances between a plurality of vehicles autonomously traveling on a circuit route, the operation control device comprising an operation management center that is configured to, at a time of removal, remove at least one of the vehicles from the circuit route, and transmit future time information and positional information indicative of a target position to each of at least three vehicles except for a removal target vehicle as a vehicle targeted for the removal, wherein:
the future time information and positional information is transmitted such that a first vehicle-to-vehicle distance between a first vehicle and a second vehicle and a second vehicle-to-vehicle distance between the second vehicle and a third vehicle becomes equal,
the at least three vehicles except for a removal target vehicle includes the first vehicle, the second vehicle, and the third vehicle, the first vehicle is a vehicle preceding the removal target vehicle, the second vehicle is a vehicle preceding the first vehicle, and the third vehicle is a vehicle following the removal target vehicle, and
the removal target vehicle is removed from the circuit route after the removal target vehicle goes around the circuit route at least once.

2. The operation control device according to claim 1, further comprising a control device configured to acquire vehicle-to-vehicle distance information indicative of a vehicle-to-vehicle distance between the vehicles, wherein the operation management center is configured to transmit the time information and the positional information that are acquired based on at least three pieces of vehicle-to-vehicle distance information.

3. The operation control device according to claim 2, wherein:
the control device is configured to further acquire second vehicle-to-vehicle distance information indicative of a distance between a vehicle preceding the removal target vehicle and a vehicle following the removal target vehicle while the removal target vehicle is traveling on the circuit route; and
the operation management center is configured to transmit the time information and the positional information further based on the second vehicle-to-vehicle distance information.

4. The operation control device according to claim 3, wherein the operation management center is configured to transmit, to the vehicle preceding the removal target vehicle, the time information and the positional information based on the vehicle-to-vehicle distance information and the second vehicle-to-vehicle distance information so that a vehicle-to-vehicle distance between the vehicle and a vehicle preceding the vehicle is equal to a distance between the vehicle and the vehicle following the removal target vehicle.

5. The operation control device according to claim 1, wherein the operation management center is configured to, at a time of removal, remove at least one of the vehicles from the circuit route and transmit future time information and positional information indicative of a target position to all vehicles in the circuit route except for the removal target vehicle.

6. A vehicle autonomously traveling on a circuit route, the vehicle comprising:
   a transmitter configured to transmit positional information of the vehicle to the operation control device of claim 1 that is configured to control vehicle-to-vehicle distances between the plurality of vehicles including the vehicle autonomously traveling on the circuit route and other vehicles;
   a receiver that is configured to receive, from the operation control device, future time information and positional information indicative of a target position for the vehicle at a time indicated by the time information, when at least one of the other vehicles is removed from the circuit route or at least one vehicle is introduced into the circuit route; and
   a controller that is configured to generate a control instruction to control the vehicle so that the vehicle reaches the target position at the time indicated by the time information.

7. An operation control device for controlling vehicle-to-vehicle distances between a plurality of vehicles autonomously traveling on a circuit route, the operation control device comprising an operation management center that is configured to, at a time of introduction, introduce at least one vehicle into the circuit route, and transmit future time information and positional information indicative of a target position to each of at least three vehicles including an introduction target vehicle as a vehicle targeted for introduction, wherein:
   the future time information and positional information is transmitted such that a first vehicle-to-vehicle distance between a first vehicle and a second vehicle and a second vehicle-to-vehicle distance between the second vehicle and a third vehicle becomes equal,
   the at least three vehicles including the introduction target vehicle includes the first vehicle, the second vehicle, and the third vehicle, where the first vehicle is a vehicle preceding the introduction target vehicle after the introduction target vehicle being introduced into the circuit route, the second vehicle is the introduction target vehicle, and the third vehicle is a vehicle following the introduction target vehicle, and
   the introduction target vehicle is introduced into the circuit route at an intermediate point between the first vehicle and the third vehicle.

8. The operation control device according to claim 7, further comprising a control device configured to acquire vehicle-to-vehicle distance information indicative of a vehicle-to-vehicle distance between the vehicles, wherein the operation management center is configured to transmit the time information and the positional information that are acquired based on at least three pieces of vehicle-to-vehicle distance information.

9. The operation control device according to claim 7, wherein the operation management center is configured to, at a time of introduction, introduce at least one vehicle into the circuit route and transmit future time information and positional information indicative of a target position to all vehicles in the circuit route including an introduction target vehicle.

10. A vehicle autonomously traveling on a circuit route, the vehicle comprising:
    a transmitter that is configured to transmit positional information of the vehicle to the operation control device of claim 7 that is configured to control vehicle-to-vehicle distances between the plurality of vehicles including the vehicle autonomously traveling on the circuit route and other vehicles;
    a receiver that is configured to receive, from the operation control device, future time information and positional information indicative of a target position for the vehicle at a time indicated by the time information, when at least one of the other vehicles is removed from the circuit route or at least one vehicle is introduced into the circuit route; and
    a controller that is configured to generate a control instruction to control the vehicle so that the vehicle reaches the target position at the time indicated by the time information.

11. The operation control device according to claim 7, wherein the introduction target vehicle is introduced into the circuit route via a route at a time that is half of a time required before the third vehicle passes through a connecting point at which the circuit route is connected to the route after the first vehicle has passed through the connecting point.

12. An operation control device for controlling vehicle-to-vehicle distances between a plurality of vehicles autonomously traveling on a circuit route, the operation control device comprising:
    a control device configured such that, when the vehicles including a removal target vehicle as a vehicle targeted for removal at a time when the vehicle is removed from the circuit route and an introduction target vehicle as a vehicle targeted for introduction at a time when the vehicle is introduced into the circuit route so as to follow the removal target vehicle travel on the circuit route, the control device acquires vehicle-to-vehicle distance information indicative of a vehicle-to-vehicle distance between the vehicles and second vehicle-to-vehicle distance information indicative of a distance between a vehicle preceding the removal target vehicle and a vehicle following the removal target vehicle; and
    an operation management center configured to
        transmit, to the introduction target vehicle following the removal target vehicle, future time information and positional information acquired based on a plurality of pieces of vehicle-to-vehicle distance information and the second vehicle-to-vehicle distance information, the positional information being indicative of a target position for the introduction target vehicle at a time indicated by the time information, the time information and the positional information being transmitted so that a distance between the introduction target vehicle and the vehicle preceding the removal target vehicle becomes equal to a vehicle-to-vehicle distance between the introduction target vehicle and a vehicle following the introduction target vehicle, and
        transmit, to the removal target vehicle, the time information and the positional information based on the pieces of vehicle-to-vehicle distance information so that a vehicle-to-vehicle distance between the removal target vehicle and the introduction target vehicle is smaller than a vehicle-to-vehicle distance between the removal target vehicle and the vehicle preceding the removal target vehicle.

13. A vehicle autonomously traveling on a circuit route, the vehicle comprising:
- a transmitter that is configured to transmit positional information of the vehicle to the operation control device of claim 12 that is configured to control vehicle-to-vehicle distances between the plurality of vehicles including the vehicle autonomously traveling on the circuit route and other vehicles;
- a receiver configured to receive, from the operation control device, future time information and positional information indicative of a target position for the vehicle at a time indicated by the time information, when at least one of the other vehicles is removed from the circuit route or at least one vehicle is introduced into the circuit route; and
- a controller that is configured to generate a control instruction to control the vehicle so that the vehicle reaches the target position at the time indicated by the time information.

* * * * *